No. 801,750. PATENTED OCT. 10, 1905.
L. M. TAYLOR.
CIRCULAR SAW FRAME ATTACHMENT.
APPLICATION FILED NOV. 21, 1904.
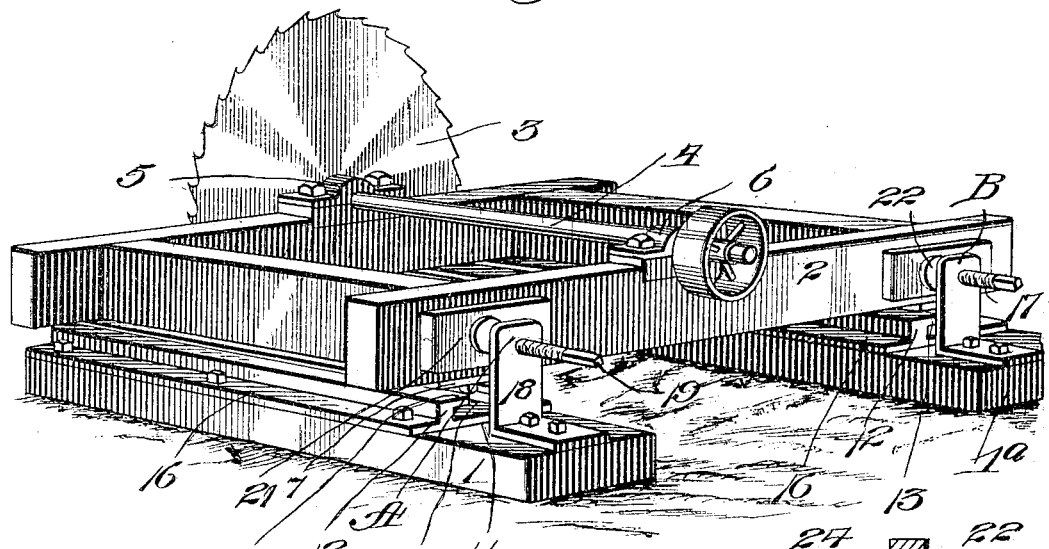
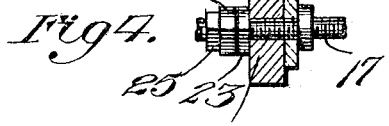
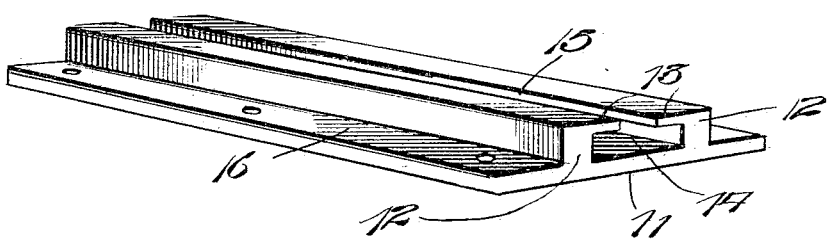
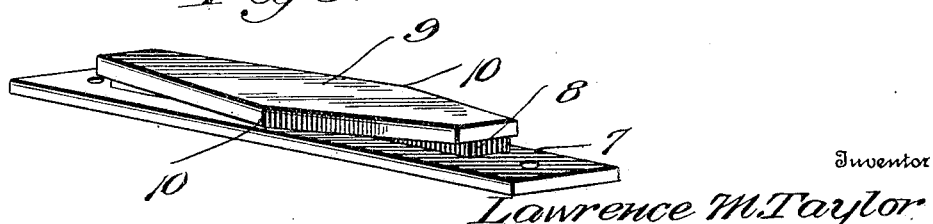
Witnesses
Phil E. Barnes
C. C. Hines
Inventor
Lawrence M. Taylor
By Victor J. Evans
Attorney

UNITED STATES PATENT OFFICE.

LAWRENCE M. TAYLOR, OF VICTOR, WEST VIRGINIA.

CIRCULAR-SAW-FRAME ATTACHMENT.

No. 801,750.    Specification of Letters Patent.    Patented Oct. 10, 1905.

Application filed November 21, 1904. Serial No. 233,737.

*To all whom it may concern:*

Be it known that I, LAWRENCE M. TAYLOR, a citizen of the United States, residing at Victor, in the county of Fayette and State of West Virginia, have invented new and useful Improvements in Circular-Saw-Frame Attachments, of which the following is a specification.

My invention relates to circular-saw-frame attachments, particularly to means for mounting the saw support or carriage so that it may be adjusted to deflect or change the line of the saw, giving it the proper "lead" into the log in such manner as to prevent the saw from becoming unduly heated.

The object of the invention is to provide simple and effective attachments whereby the saw may be adjusted for the purpose set forth without the necessity of slueing the saw shaft or mandrel, and, further, to provide attachments of this character which may be readily applied to existing circular-saw structures.

With this and other objects in view the invention consists of the features of construction, combination, and arrangement of parts, hereinafter more fully described and claimed, reference being had to the accompanying drawings, in which—

Figure 1 is a perspective view of a circular saw and frame equipped with my invention. Fig. 2 is a detail perspective view of one of the keepers or guide-rails. Fig. 3 is a similar view of the rocker or guide-shoe; and Fig. 4 is a detail section through a portion of the saw-carriage, showing the connection of one of the adjusting-shafts therewith.

In the drawings, 1 1$^a$ represent spaced sills or supporting-beams, and 2 the saw-supporting frame mounted thereon, which so far as at present described may be of ordinary construction. In circular-saw apparatus of the type in common use the frame 2 is rigidly secured to the sills 1 1$^a$ or a foundation-frame, and provision is usually made for changing the line or lead of the saw by mounting the saw shaft or mandrel in movable or adjustable bearings, in the operation of which, owing to the angle of inclination to which the shaft must be adjusted for this purpose, additional friction is produced between the shaft and bearing adjacent to the saw, resulting in the saw becoming unduly heated and working with difficulty.

The object of my invention is to avoid this undue friction on the shaft and bearing and consequent overheating of the saw, and to this end I provide a construction of parts whereby the saw frame or support may be adjusted to change the lead or line of the saw without varying the position of the shaft or mandrel on said support, such parts being adapted for application to existing saw-frames of ordinary construction to adapt the same for effecting the adjustment of the saw in this manner. In accordance with my invention the frame or carriage 2, which forms a support for the saw, its shaft or mandrel and the bearings therefor, is adjustably mounted upon the sills or supporting beams to change the line or lead of the circular saw 3, which is mounted upon one end of the shaft or mandrel 4, journaled in fixed or immovable bearings 5 and 6, suitably applied to the opposite sides of the frame 2. To this end the frame 2 is provided with shoes or guide members which slidably and pivotally engage guide-rails upon the frame 1, said shoes being mounted upon opposite sides of the frame 2 and each comprising a bracket or attaching plate 7, adapted to be secured in any preferred way to said frame and provided with a longitudinally-extending neck or web portion 8, carrying a shoe or contact plate 9, and properly spacing it from the said bracket 7. The shoe or contact plate 9 extends longitudinally of the plate 7 and has its side edges converged from opposite ends toward the center thereof, forming a shoe or contact plate, which is approximately of truncated triangular form and provided with opposite central reduced or pointed bearing portions 10.

Each shoe slidably and pivotally engages one of the guide members or keepers on the sills 1 1$^a$, each of which keepers or guide members consist of a bracket or body plate 11, provided with upwardly-extending longitudinal parallel ribs 12, formed or provided at their upper ends with inwardly-extending flanges 13, terminating a suitable distance apart to form a guide-chamber 14, receiving the shoe or contact plate 9 and having an entrance-slot 15 for the passage of the neck or web 8 of the shoe, the said flanges further serving as overhanging stops engaging the sides of the shoe 9 to prevent the same from having upward movement and becoming displaced from the guide-chamber 14. The sides of the body or bracket portion 11 are extended laterally to form attaching-plates or flanges 16, adapted to be secured in any preferred manner to the supporting-sill 1 or 1$^a$. When the parts are fitted together, the bearings or contact portions 10 of the shoe engage the inner sides of the opposite ribs 12 of the keeper or guide member, thus permitting the shoe to rock or swing laterally in the keepers or guide members to enable the frame 2 to be swung at an angle to its normal position to change the line or lead of the saw 3 without varying the position of the shaft 4 or its bearings 5 and 6 on said frame, as will be readily understood. The shoes are also permitted to slide longitudinally in said keepers or guide members, so that the frame 2 may be adjusted on its support to move the saw 3 in and out, and thus vary its working position with relation to the path of movement of the log-carriage. (Not shown.) By making each shoe 9 of truncated triangular form or having its portions extended beyond the web 8 converged toward the center thereof frictional contact with the sides of the ribs 12 of the keepers is reduced and the shoes permitted to rock and slide freely in the guideways without liability of hanging or binding therein.

It will be observed that the guide members and shoes are of such form and construction that they may be readily assembled and disassembled and conveniently attached to existing saw structures to adapt the saw frame or carriage thereof for adjustment in accordance with the principles of the present invention, it simply being necessary to detach the saw-frame 2 from the sills 1 1$^a$ and to apply the shoes and guide members thereto to adapt the said frame 2 to rock and slide upon said sill. The bearings 10 of the shoes in effect form a sliding pivotal connection between the saw-supporting frame and sills to permit the frame to rock or swing at the desired angle without the necessity of providing compensating means to permit of the required variation in position of the two sets of bearings when the saw-frame is shifted or swung at an angle to the sills.

In order to adjust the frame 2, adjusting devices A and B are provided upon the rear side of the frame 2 and rear ends of the sills 1 1$^a$, each of said devices comprising a screw-shaft 17, mounted in a threaded aperture in a standard 18, secured upon the rear end of the coöperating sill, one end of the said shaft being arranged to project beyond the rear end of the said standard and provided with an angular head 19 for application of a wrench or other suitable tool by which it may be turned in one direction or the other to advance or retract the adjacent end of the carriage 2. The other end of the shaft extends loosely through an opening 20 in the adjacent side of the frame 2 and through an opening in a bearing plate or washer 21, which bears against and is secured to the outer or rear face of the said side of the frame.

On the shaft is a fixed collar 22, which bears against the outer side of the plate or washer and coöperates with a collar 23, loosely mounted on the shaft and bearing against the inner face of the said adjacent side of the frame to secure the shaft thereto and hold it against independent movement. The collar 23 is held in position and clamped against the frame by a securing-nut 24, which is held against retrograde rotation by a check-nut or jam-nut 25.

The normal position of the parts is shown in Fig. 1, from which it will be seen that the saw 3 extends at right angles to the sills 1$^a$ and 1$^b$. In adjusting the saw for work it is necessary to deflect the saw to a slight extent to give it a little lead into the log or material to be sawed. This lead or deflection ordinarily should not exceed one-eighth of an inch in twenty feet, but it is necessary in order to prevent the back of the saw from scratching against the timber after cutting and becoming heated. This deflection of the saw may be quickly and conveniently accomplished by adjusting one or the other of the screw-shafts 17, according to the direction of travel of the log-carriage, to shift one of the ends of the saw-frame in a forward direction, thus changing the position of its shoe in the coacting keeper or guideway, the shoe in such movement assuming an inclined position in the guideway 14 to compensate for the variation in the position of the saw-frame. This operation may be accomplished at any position along the extent of the guideway, to which the shoes may be adjusted by a sliding movement to advance or retract the saw to project into the path of travel of the log-carriage, and in such adjustment the pivotal or rocking action of the bearing-points 10 of the shoe in the guideway 14 permits the saw-frame to swing with a minimum of resistance, so as to enable the operation to be performed by the expenditure of comparatively light pressure. When it is desired to restore the saw-frame to its normal position, the screw-shaft, which has been adjusted, is simply turned back to its normal position, thus righting the carriage and bringing the saw back into its normal plane of movement. In some instances where the saw-frame is to be swung to a greater extent than ordinarily both adjusting screw-shafts may be operated, one to a less extent than the other, to effect the adjustment of the frame, as will be readily understood.

In prior constructions of devices of this character in which the line or lead of the saw is changed by shifting the shaft or mandrel or its bearing, it has been found that the change in the position of the shaft, owing to its angle of inclination to the frame, results in the bearing 5 immediately adjacent to the saw being heated by the friction produced from the shaft being shifted to bear unequally upon the wall of the journal-opening, which heat is transmitted to the saw, causing it to work badly. My construction effectually avoids this objection, as by shifting the saw frame or support without varying the relative position of the saw shaft or mandrel the position of the saw-journals in the bearings is not varied and binding is prevented, so that the adjustment of the saw to change its line or lead does not in any way produce increased friction on the shaft or its bearings, and, further, a construction of parts is provided whereby existing saw structures may be quickly and conveniently converted for adjustment in accordance with the principles of the invention without varying the form or structure thereof in any essential particular. By arranging the keepers or guide members, shoes, or rockers, and the adjusting devices at opposite ends of the base-supports and saw-frame the latter may not only be shifted to conform to the direction of travel of the log-carriage, but also to change the line or lead of the saw in either direction.

By the use of the term "immovable" as applied to the bearings 5 and 6 is meant any construction in which the shaft-bearings (or bearing) are not mounted for movement to permit the shaft to be slued for the purpose of changing the line or lead of the saw.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what I claim as new is—

1. In an attachment for sawmills to adapt the carriages thereof for sliding movement, the combination of a guide member adapted to be secured to the main frame of the carriage, said guide member comprising a base having longitudinal upwardly-projecting portions having inwardly-projecting flanges forming a slotted guideway, and a coöperating guide member adapted for adjustment to a carriage and comprising a bracket having a web or neck to slide in the slot of the guideway, and a shoe to slidably and pivotally fit within the guideway, substantially as described.

2. In a device of the character described, a guide member comprising a base provided with longitudinal parallel ribs and inwardly-projecting flanges forming a guideway and a communicating slot and a coöperating guide member comprising a bracket having a shoe to traverse said guideway member, and a neck connecting the same with the bracket and adapted to slide in the slot, said shoe having converging sides for pivotal movement and to decrease resistance, substantially as described.

3. In a circular-saw apparatus, the combination of a base-support, a saw-carrying frame, a saw and its mandrel supported thereon, conjunctively-arranged guides and shoes operatively mounting the saw-carrying frame upon said support to slide in a plane transverse to the plane of rotation of the saw and to tilt at right angles to such plane of movement to change the lead of the saw.

4. In a circular-saw apparatus, the combination of a support, a saw-carrying frame mounted thereon, a saw-mandrel and saw carried by said frame, guides on the support arranged on opposite sides and in planes parallel with the plane of the mandrel, shoes upon the frame engaging said guides and adapted to rock therein to permit the frame to be tilted to change the lead of the saw, and means arranged in juxtaposition to each guide and its shoe for shifting the frame on either side of its center line to effect tilting thereof in one direction or the other.

5. In a circular-saw apparatus, the combination of a base-support, a saw-carrying frame, guide members carried by the support, coacting members carried by the frame and movably engaging the guides to permit the frame to be tilted to change the lead of the saw, said members being independently and removably attached to the support and frame, and means for shifting the frame to swing upon said members, whereby the lead of the saw may be changed, substantially as described.

In testimony whereof I affix my signature in presence of two witnesses.

LAWRENCE M. TAYLOR.

Witnesses:
 B. W. EAGLE,
 W. B. WALKER.